United States Patent
Lee

(10) Patent No.: US 7,262,540 B2
(45) Date of Patent: Aug. 28, 2007

(54) STATOR OF OUTER ROTOR TYPE MOTOR FOR DRUM TYPE WASHING MACHINE

(75) Inventor: Woon Yong Lee, Gwangsan-gu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/045,158

(22) Filed: Jan. 31, 2005

(65) Prior Publication Data

US 2005/0189837 A1   Sep. 1, 2005

(30) Foreign Application Priority Data

Feb. 26, 2004   (KR) ...................... 10-2004-0012996
Feb. 26, 2004   (KR) ...................... 10-2004-0012997

(51) Int. Cl.
*H02K 1/12*   (2006.01)
*H02K 1/14*   (2006.01)
*H02K 15/02*  (2006.01)

(52) U.S. Cl. ...................... 310/217; 310/216; 310/254; 310/215; 310/194

(58) Field of Classification Search ........ 310/216–217, 310/254, 259
See application file for complete search history.

(56) References Cited

U.S. PATENT DOCUMENTS

| | | | |
|---|---|---|---|
| 3,225,424 A * | 12/1965 | Wiley ........................... 29/605 |
| 4,206,621 A * | 6/1980 | Kawasaki et al. ............. 72/130 |
| 4,712,035 A * | 12/1987 | Forbes et al. ................ 310/269 |
| 4,813,248 A * | 3/1989 | Smith et al. .................. 68/23.7 |
| 4,818,911 A * | 4/1989 | Taguchi et al. .............. 310/259 |
| 4,835,839 A | 6/1989 | Forbes et al. |
| 4,894,905 A * | 1/1990 | Tanaka et al. ................. 29/598 |
| 5,040,285 A * | 8/1991 | Williams et al. .............. 29/596 |
| 5,457,350 A * | 10/1995 | Sakamaki et al. ........... 310/216 |
| 5,489,811 A * | 2/1996 | Kern et al. .................. 310/216 |
| 5,717,273 A * | 2/1998 | Gulbrandson et al. ...... 310/260 |

(Continued)

FOREIGN PATENT DOCUMENTS

GB     1477005     *   6/1977

(Continued)

*Primary Examiner*—Burton Mullins
(74) *Attorney, Agent, or Firm*—Birch, Stewart, Kolasch & Birch, LLP

(57) ABSTRACT

The present invention provides an outer rotor type motor for a drum type washing machine to reduce material and weight for fabrication, simplify fabrication process, provide stable assembly of a stator to a fixing side, such as a tub or a bearing housing, prevent unwinding of stacked steel plates in assembling a helical core, and reduce stress on the steel plates of the core. The present invention includes a helical core having multiple layers formed by winding steel plates in a helix starting from a bottom layer to a top layer, the steel plate having a base portion with teeth projected from the base portion, an upper insulator of an electric insulating material covered on an upper side of the helical core in a shape complementary to a shape of the helical core, a lower insulator of an electric insulating material covered on a lower side of the helical core at the time of assembly with the upper insulator having a shape complementary to a shape of a helical core, and a fastening means for at least two steel plates wound in a helix to prevent unwinding of any two adjacently stacked steel plates and prevent gaps between any two adjacent layers of the stacked steel plates.

22 Claims, 9 Drawing Sheets

U.S. PATENT DOCUMENTS

| | | | |
|---|---|---|---|
| 5,737,944 A | * | 4/1998 | Nishimura et al. .......... 68/23.7 |
| 5,831,366 A | | 11/1998 | Kern et al. |
| 5,969,455 A | * | 10/1999 | Sakamoto .................. 310/194 |
| 6,992,417 B1 | * | 1/2006 | Yamada ..................... 310/194 |

FOREIGN PATENT DOCUMENTS

| | | | |
|---|---|---|---|
| JP | | 07-079551 | * 3/1995 |
| WO | | WO-92/22121 A1 | 12/1992 |

* cited by examiner

STATOR OF OUTER ROTOR TYPE MOTOR FOR DRUM TYPE WASHING MACHINE

This application claims the benefit of the Korean Application No. P2004-12996 and P2004-12997 both filed on Feb. 26, 2004, which are hereby incorporated by reference.

BACKGROUND OF THE INVENTION

1. Field of the Invention

The present invention relates to a drum type washing machine, and more particularly, to a stator of an outer rotor type BLDC motor, which is applicable to a direct coupling type drum type washing machine.

2. Discussion of the Related Art

Generally, a drum type washing machine performs washing operation with the aid of a drive force of a motor which spins a drum containing laundry, detergent, and water, to cause friction between laundry and water. The drum type washing machine causes almost no damage to the laundry, prevents tangling of the laundry, and brings about the effects of pounding and rubbing.

Drum type washing machines are categorized by an indirect coupling type and a direct coupling type according to a drive system. In the indirect coupling type, a drive force of a motor is indirectly transferred to a drum via a motor pulley and a belt wound to the drum pulley. In the direct coupling type, a rotor of a BLDC motor is directly coupled with a drum to directly transfer a drive force to the drum.

Yet, in the indirect coupling type system that transfers the drive force of the motor to the drum via the motor pulley and the belt wound on the drum pulley instead of transferring the drive force of the motor to the drum directly, energy loss occurs in the process of drive force transfer and considerable noise is generated.

Hence, the direct coupling drum type washing machine using the BLDC motor is widely used to solve the above problems of the drum type washing machine.

FIG. 1 is a cross-sectional diagram of a direct coupling drum type washing machine according to a related art.

Referring to FIG. 1, a tub 2 is provided within a cabinet 1, and a drum 3 is rotatably provided within the tub 2.

A motor is provided to a rear portion of the tub 2. Specifically, a stator 6 is fixed to a rear wall of the tub 2 and a rotor 5 encloses the stator 6 to be coupled to the drum 3 via a shaft.

A door 21 is provided to a front portion of the cabinet 1 and a gasket is provided between the door 21 and the tub 2.

A hanging spring 23 supporting the tub 2 is provided between an inside of a top portion of the cabinet 1 and an upper outer circumference of the tub 2, and a friction damper 24 is provided between an inside of a bottom portion of the cabinet 1 and a lower outer circumference of the tub 2 to attenuate vibration of the tub 2.

FIG. 2 is a perspective diagram of a stator in FIG. 1 and FIG. 3 is a perspective diagram of a sectional core (SC) applied to the stator in FIG. 2.

A method of manufacturing a helical core according to a related art is explained as follows.

First of all, a plurality of unit cores are fabricated by a pressing process of a steel plate. In doing so, each of the unit cores consists of teeth 151, a base 150, and a protrusion 500 opposite to the teeth 151 for forming a fastening hole 500a. A plurality of the unit cores are stacked to form a plurality of assemblies. And, a plurality of the assemblies are linked in a circumferential direction to complete a stator core that is so-called a sectional core.

The protrusion 500 plays a role in standing a fastening force of a bolt as well as provides the fastening hole 500a necessary for fastening a stator to the rear wall of the tub.

Yet, such a method of manufacturing the stator 6 with the sectional core SC is very complicated and brings about considerable loss of materials.

Meanwhile, a helical core, which is manufactured by helically stacking a steel plate consisting of teeth 151 and a base 150, is very useful in reducing the loss of materials and simplifying the manufacturing process. Yet, in manufacturing the helical core HC, the steel plate blanked like a strap needs to be helically bent. Hence, it is unable to provide a protrusion for coupling a stator with a tub to an inside of the core.

If the protrusion 500 is provided to the inside of the core in manufacturing the helical core HC, a core width of a part reserved for the protrusion is too large to bend the core.

Accordingly, a stator structure that enables the same role of the protrusion of the sectional core to be performed not by the core itself but by another portion is needed to be applicable to the helical core HC.

Meanwhile, it is important to sufficiently secure the rigidity of the protrusion provided with the fastening hole for securing the stator to the tub, which is explained as follows.

First of all, in a washer that rotates a drum directly using a BLDC motor, a stator is directly assembled to a fixing side of a rear portion of the tub. If the stator of a motor for a high capacity drum type washer weighs over 1.5 kg and if a dewatering rotational speed is 600~2,000 RPM, a fastening portion of the stator 6 is broken due to the stator weight, the vibration of the high rotation, and the shake and transformation of the rotor 5.

Specifically, in case that the stator is coupled with the rear wall of the tub of the drum type washer using the BLDC motor, a radial direction of the stator almost maintains parallel to a ground, the breakage of the fastening portion of the stator 6 to the rear wall of the tub gets worsened due to the vibration occurring on driving the washer.

Therefore, it is important to sufficiently secure the rigidity of the protrusion provided with the fastening hole for securing the stator 6 to the tub.

SUMMARY OF THE INVENTION

Accordingly, the present invention is directed to a stator of an outer rotor type motor for a drum type washing machine that substantially obviate one or more problems due to limitations and disadvantages of the related art.

An object of the present invention is to provide an outer rotor type motor for a drum type washing machine, by which a material and weight for fabrication are reduced, by which a fabrication process is simplified, and by which a stator can be stably assembled to a fixing side such as a tub or a bearing housing.

Another object of the present invention is to provide a stator of an outer rotor type motor for a drum type washing machine, in which a stator can be stably assembled to a fixing side such as a tub or a bearing housing and by which the stator weighing at least 1.5 kg is applicable to a drum type washing machine BLDC motor having a rotational speed over 2,000 RPM.

Another object of the present invention is to provide a stator of an outer rotor type motor for a drum type washing machine, by which unwinding of any two adjacently stacked steel plates and gaps between any two adjacent layers of the stacked steel plates are prevented.

A further object of the present invention is to provide a stator of an outer rotor type motor for a drum type washing machine, by which unwinding of any two adjacently stacked steel plates is prevented in assembling the helical core and by which stress on the steel plates is reduced to facilitate assembly of the core.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stator of an outer rotor type motor for a drum type washing machine according to the present invention a helical core having multiple layers formed by winding steel plates in a helix starting from a bottom layer to a top layer, the steel plate having a base portion with teeth projected from the base portion; an upper insulator of an electric insulating material covered on an upper side of the helical core in a shape complementary to a shape of the helical core, a lower insulator of an electric insulating material covered on a lower side of the helical core at the time of assembly with the upper insulator having a shape complementary to a shape of a helical core, and a fastening means for at least two steel plates wound in a helix so as to prevent unwinding of any two adjacently stacked steel plates and prevent gaps between any two adjacent layers of the stacked steel plates.

In this case, fastening means includes an engaging protrusion provided to each upper or lower surface of the teeth of the steel plate, and a engaging recess provided to each lower or upper surface of the teeth of the steel plate to correspond to the engaging protrusion.

Furthermore, the stator further comprises at least three fastening portions formed as one body in each of the upper and the lower insulator which projects from an inside of the helical core toward a center of the stator for securing the stator to a fixing side of a tub.

In another aspect of the present invention, a stator of an outer rotor type motor for a drum type washing machine includes a helical core having multiple layers formed by winding steel plates in a helix starting from a bottom layer to a top layer, the steel plate having a base portion with teeth projected from the base portion, an upper insulator of an electric insulating material covered on an upper side of the helical core in a shape complementary to a shape of the helical core, and a lower insulator of an electric insulating material covered on a lower side of the helical core at the time of assembly with the upper insulator having a shape complementary to a shape of a helical core, wherein the base portion of the helical core includes slots for reducing stress during winding the core.

In this case, a central portion of each slot represents a maximum depth and depths of each slot symmetrically become smaller toward lateral side portions away from the central portion, the depths of the lateral side portions symmetrically becoming small enough to connect to an edge of the base portion.

And, each slot is provided at the base portion of the helical core and located between two adjacent teeth.

Moreover, the stator further includes at least three fastening portions formed as one body in each of the upper and the lower insulator which projects from an inside of the helical core toward a center of the stator for fastening the stator to a fixing side of a tub.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

One embodiment of the present invention is explained with reference to FIGS. 4 to 9 as follows.

First of all, one embodiment of the present invention is explained with reference to FIGS. 4 to 7 as follows.

Figure 1:
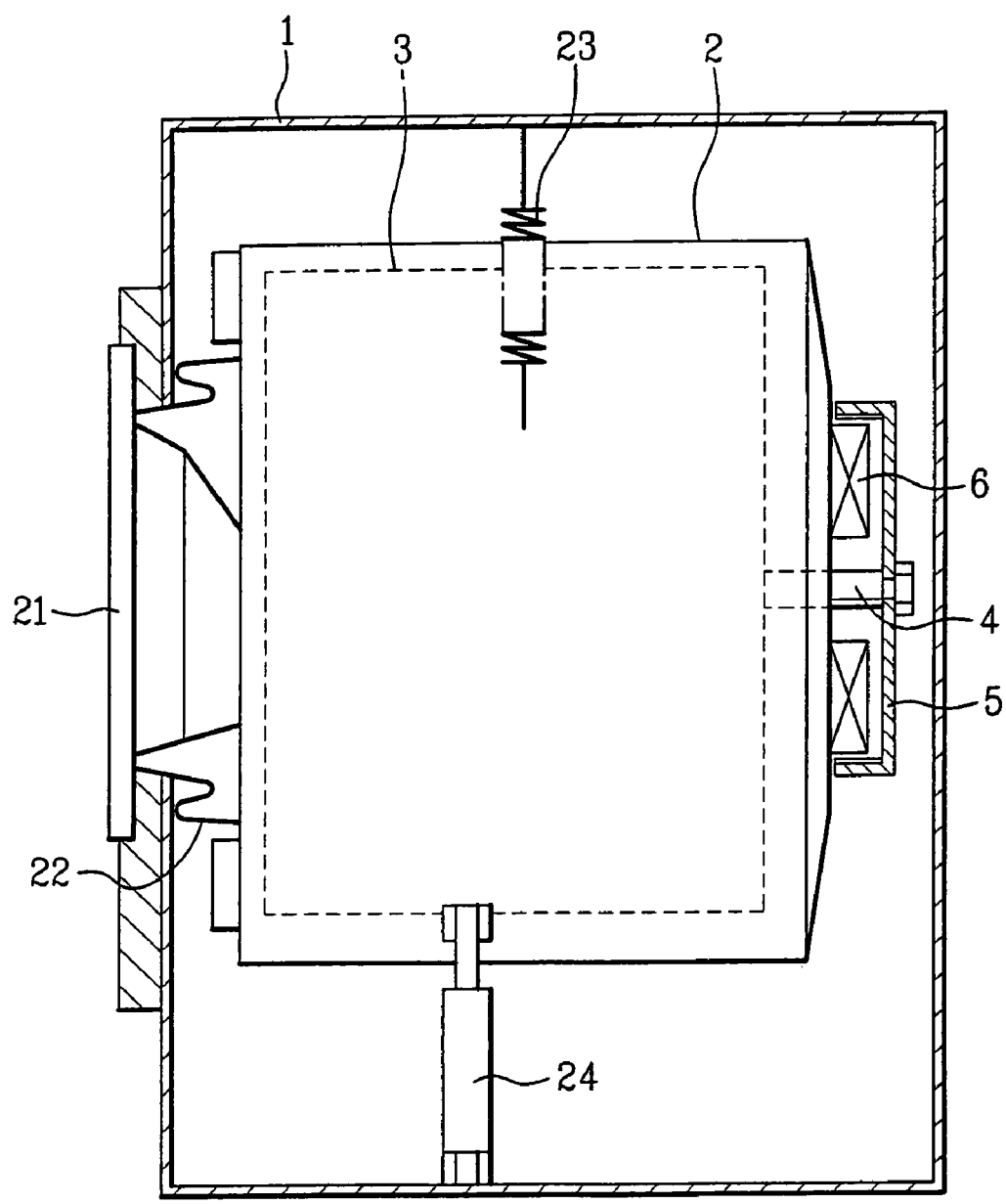
FIG. 1 is a cross-sectional diagram of a direct coupling drum type washing machine according to a related art.
Figure 2:
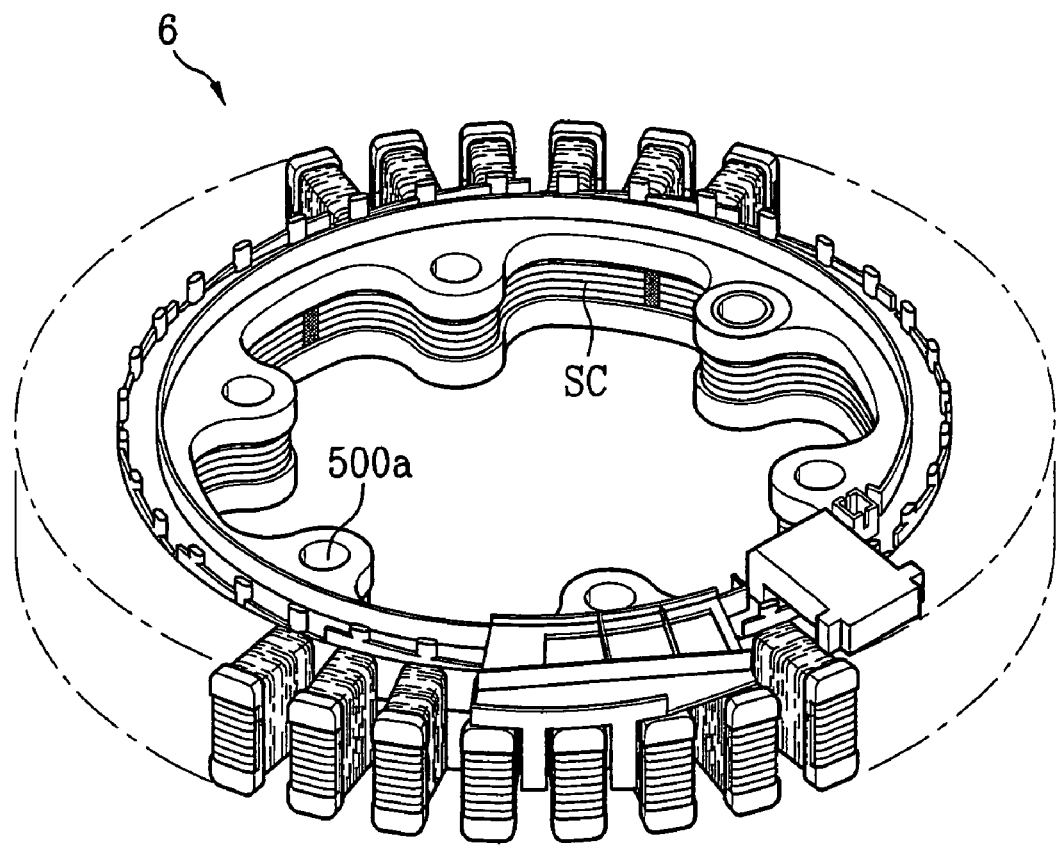
FIG. 2 is a perspective diagram of a stator according to a related art.
Figure 3:
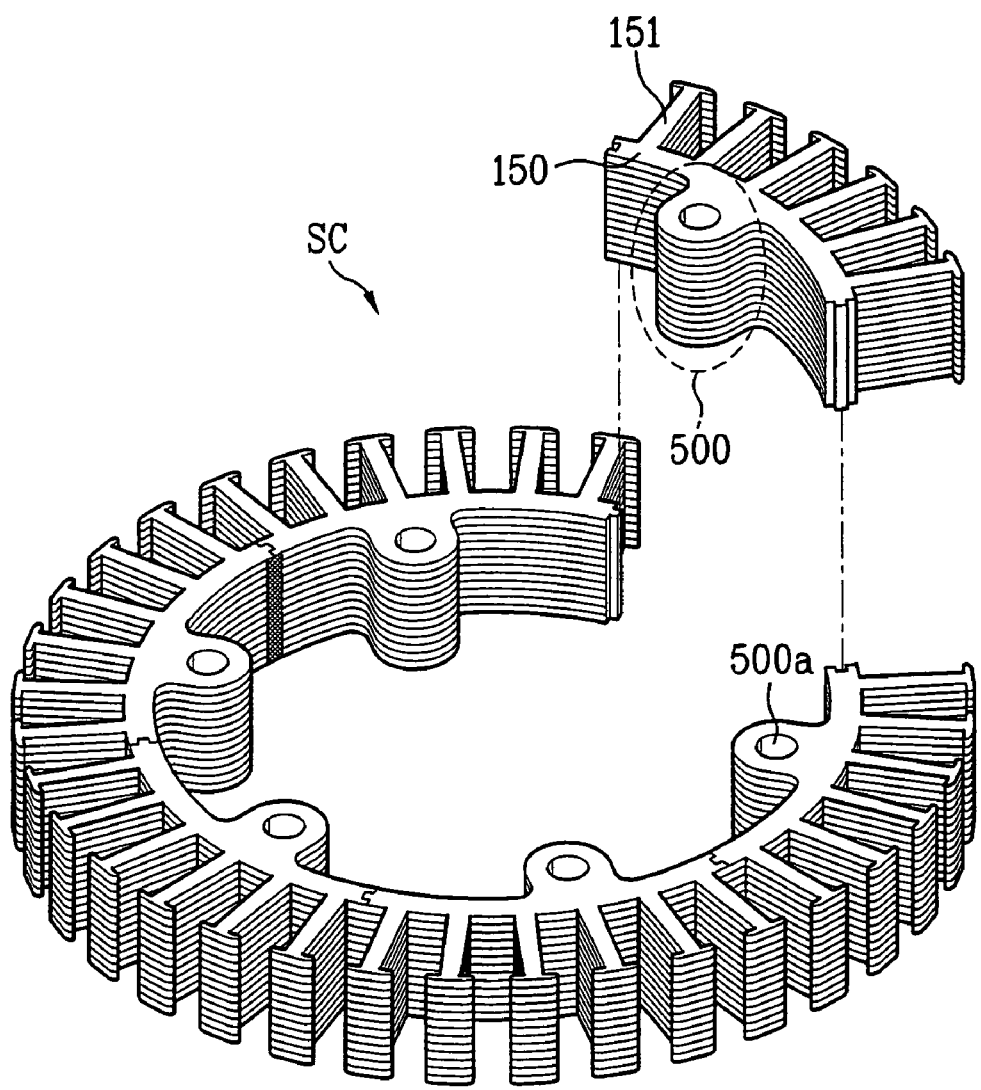
FIG. 3 is a perspective diagram of a sectional core of the stator in FIG. 2.
Figure 4:
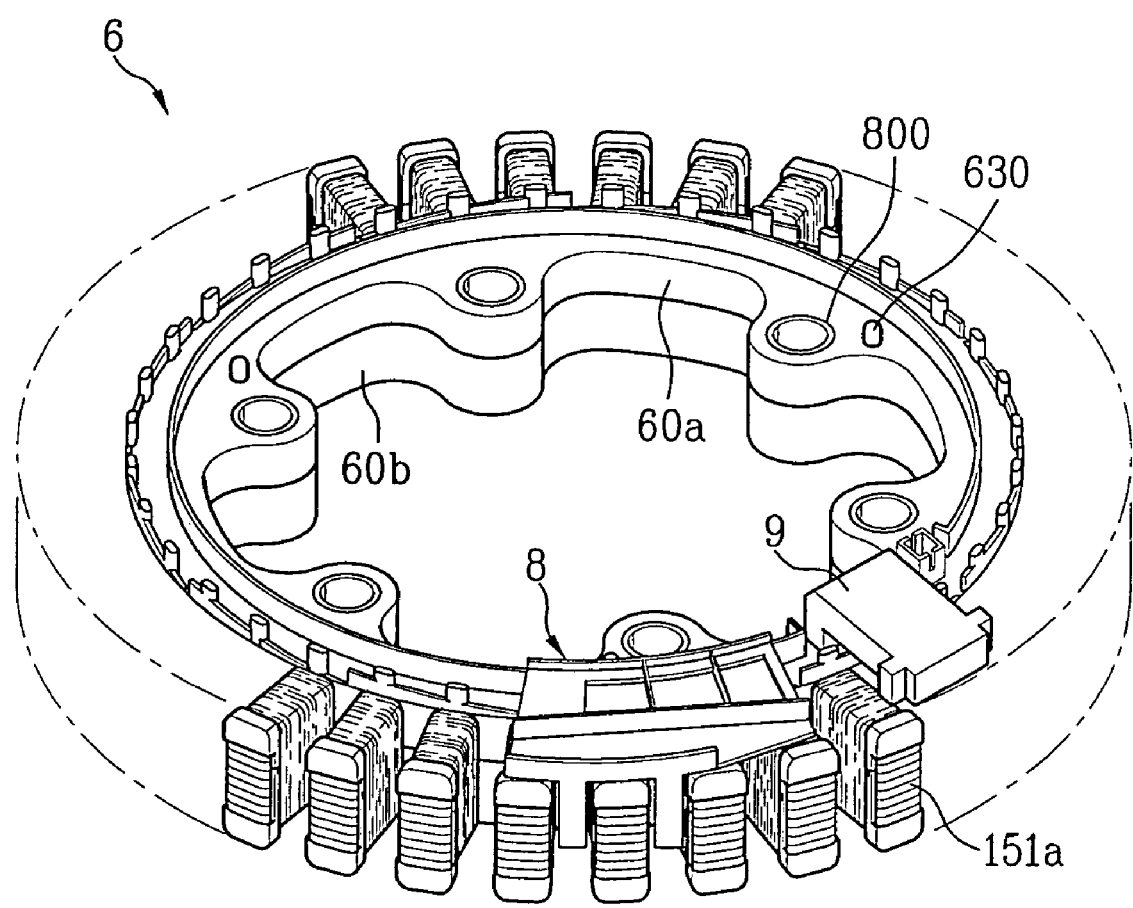
FIG. 4 is a perspective diagram of a stator according to the present invention.
Figure 5:
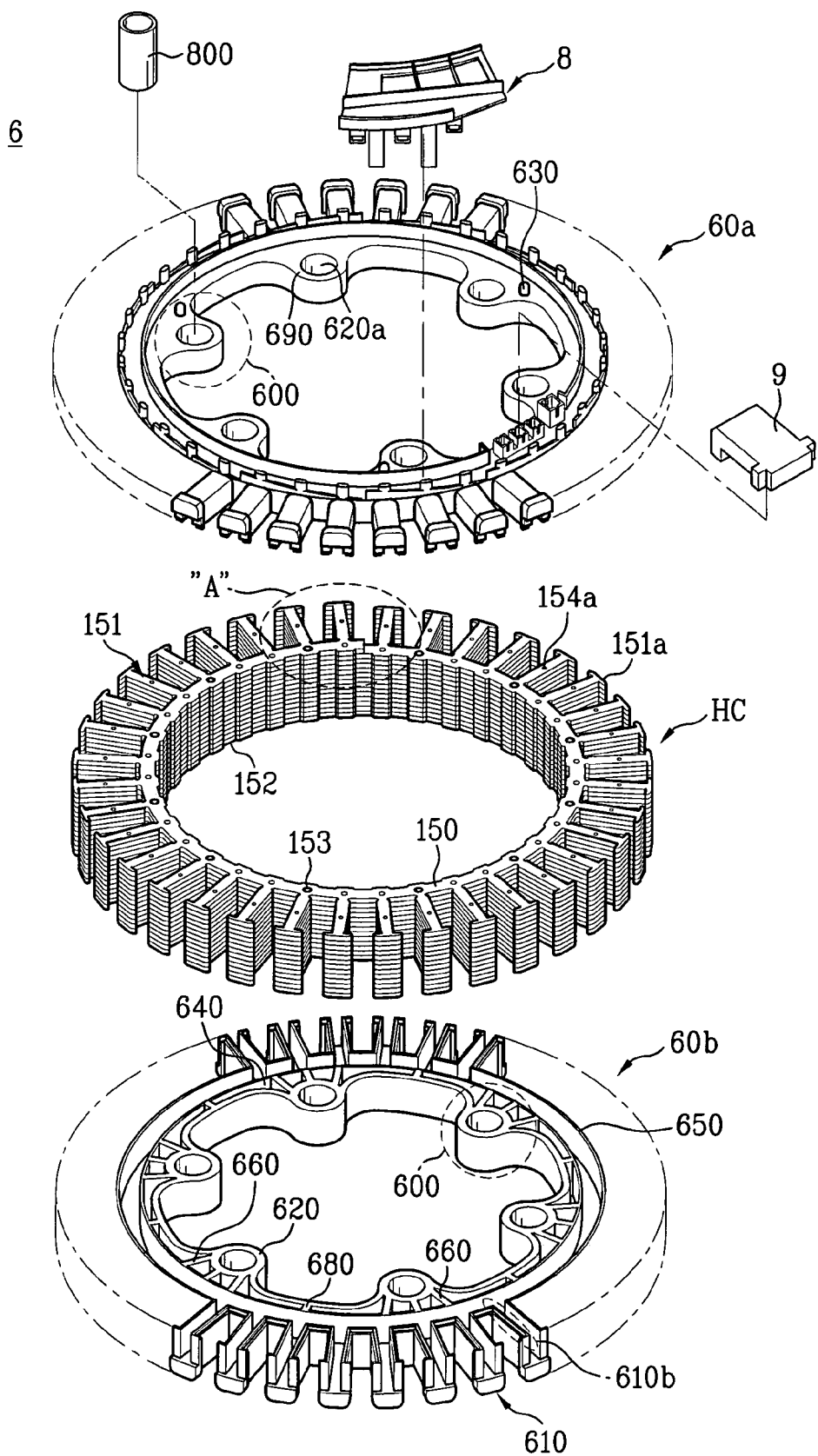
FIG. 5 is a projected perspective diagram of the stator in FIG. 4.

FIG. 4 is a perspective diagram of a stator according to the present invention and FIG. 5 is a projected perspective diagram of the stator in FIG. 4.

Figure 6A:
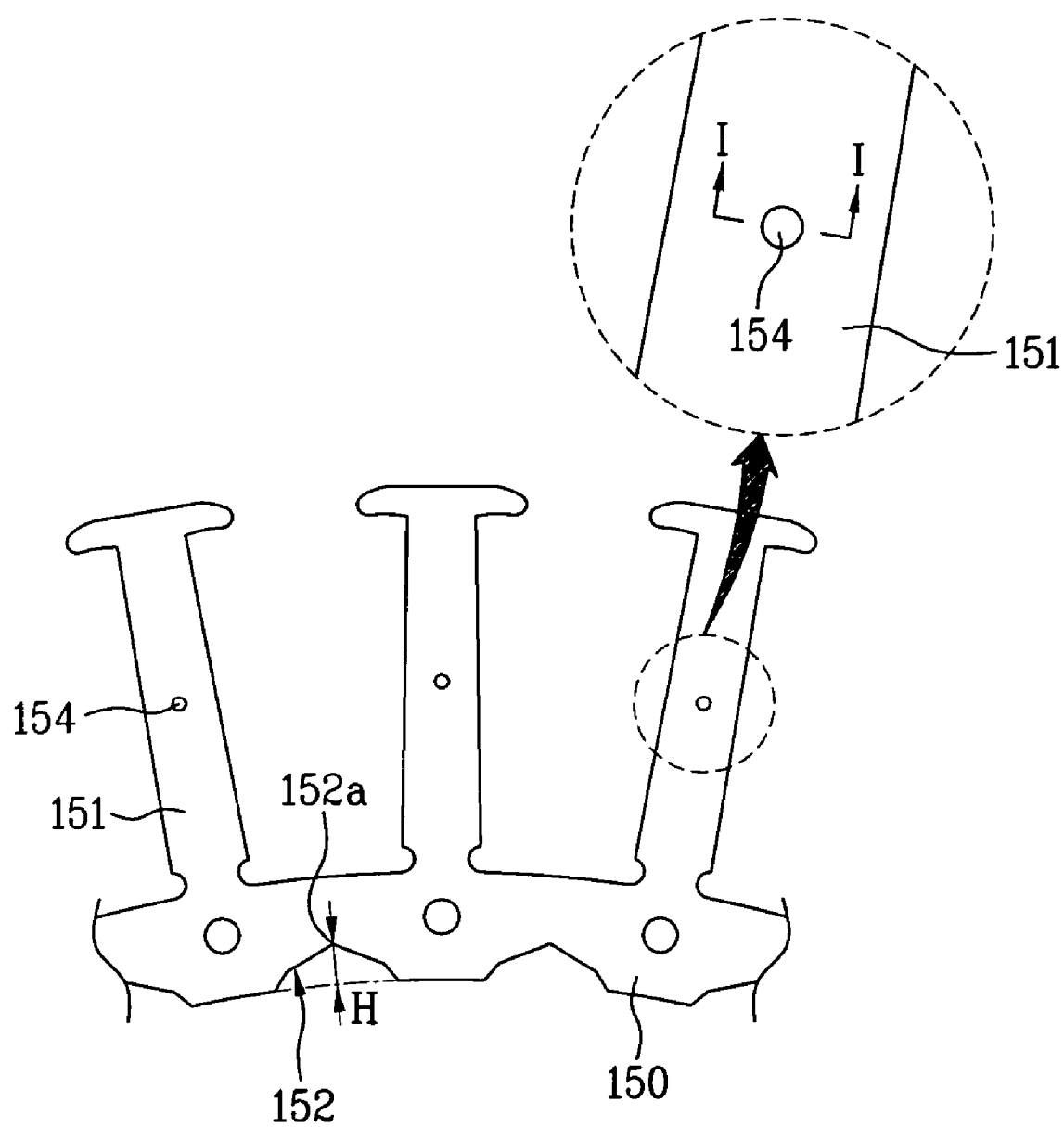
FIG. 6A is a layout of a part 'A' in FIG. 5.
Figure 6B:
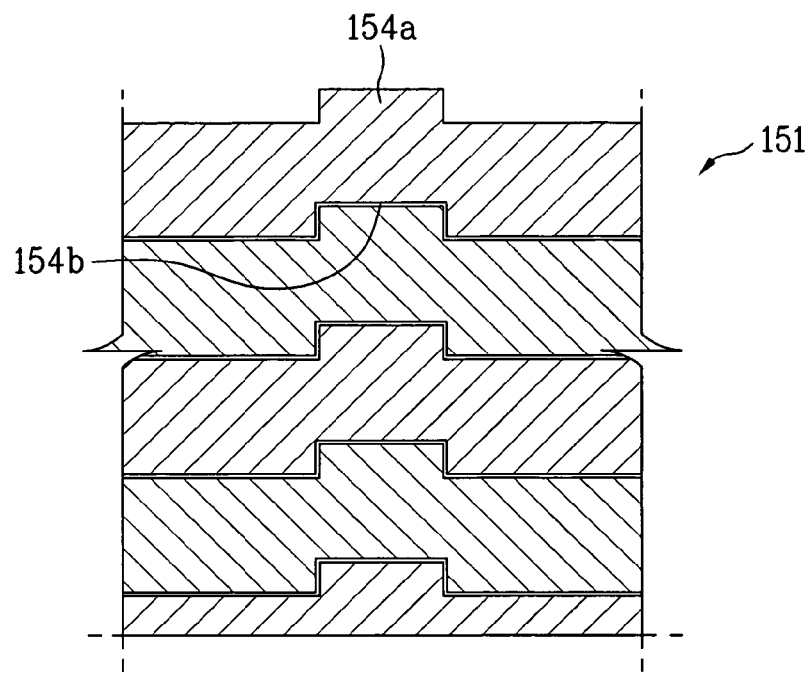
FIG. 6B is a cross-sectional diagram of a helical core according to a cutting line I-I in FIG. 6A, in which a stacked structure is shown.

FIG. 6A is a layout of a part 'A' in FIG. 5 and FIG. 6B is a cross-sectional diagram of a helical core according to a cutting line I-I in FIG. 6A, in which a multi-layer structure is shown.

Figure 7:
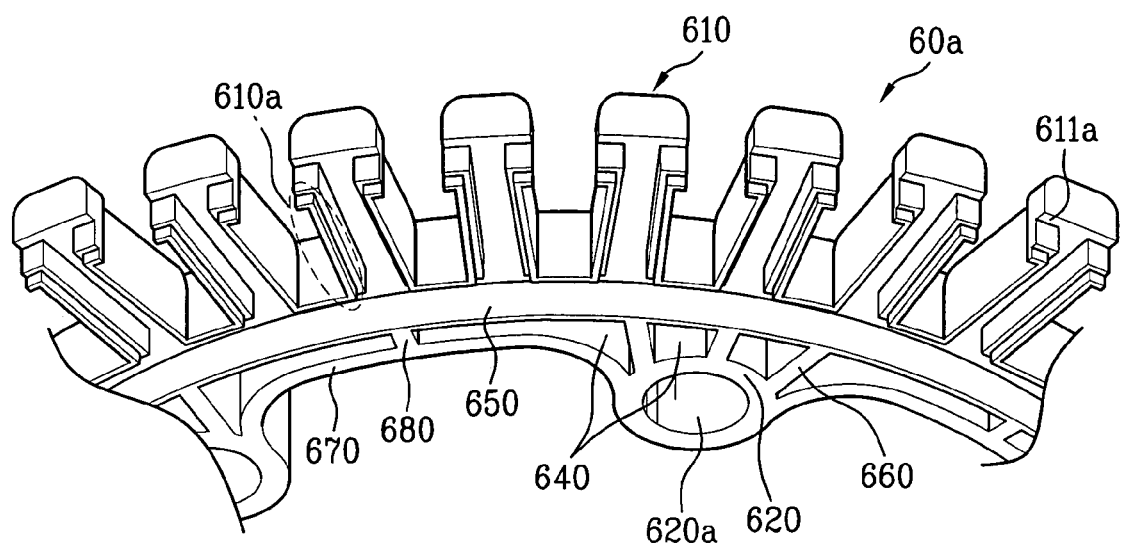
FIG. 7 is a perspective diagram of a backside of an upper insulator in FIG. 5.
Figure 8:
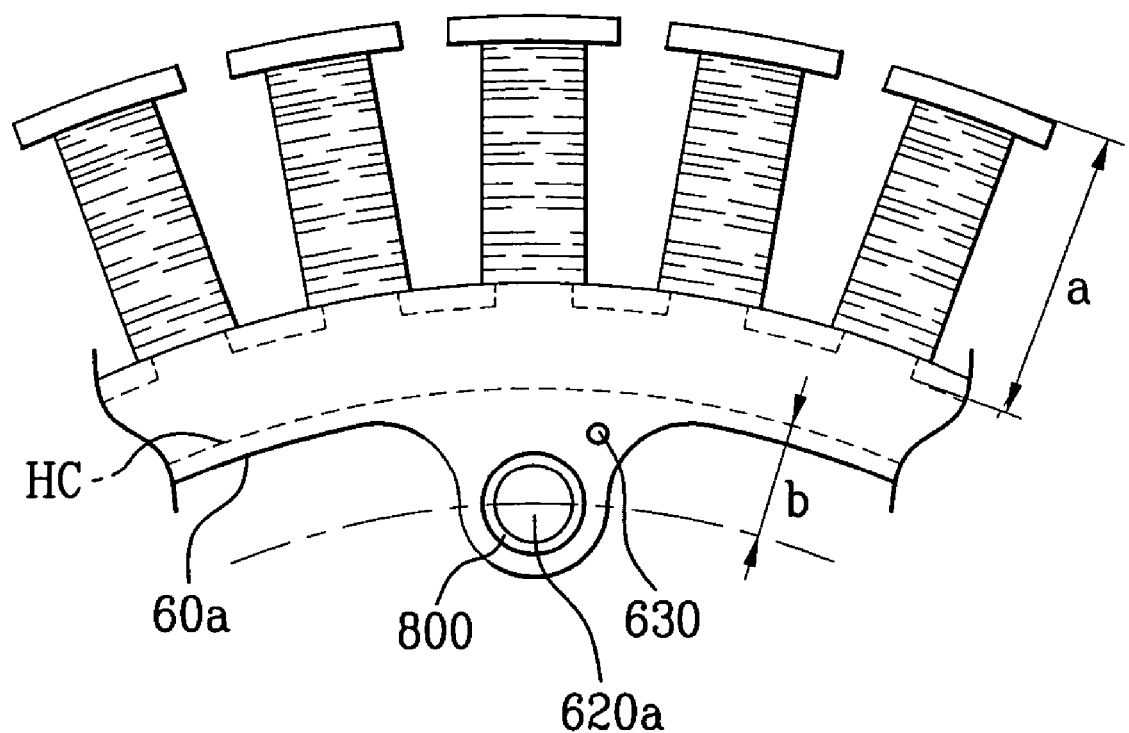
FIG. 8 is a layout of the stator in FIG. 4.
Figure 9A:
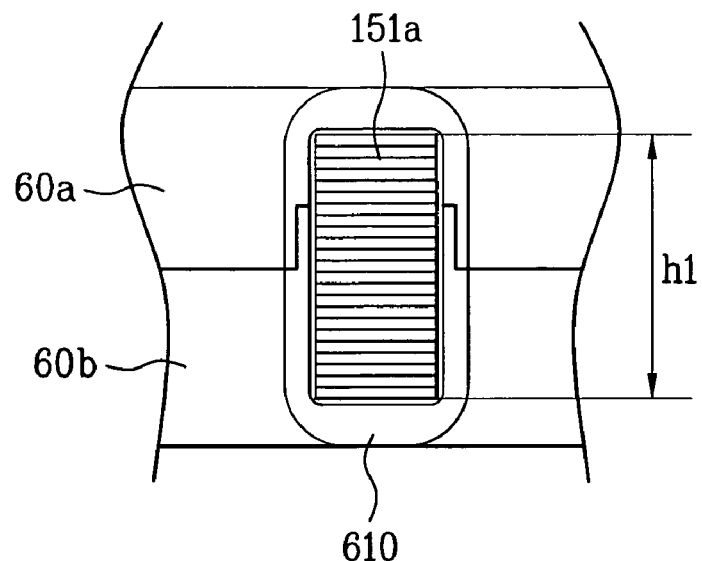
FIG. 9A and FIG. 9B are front diagrams of an insulator for common use.
Figure 9B:
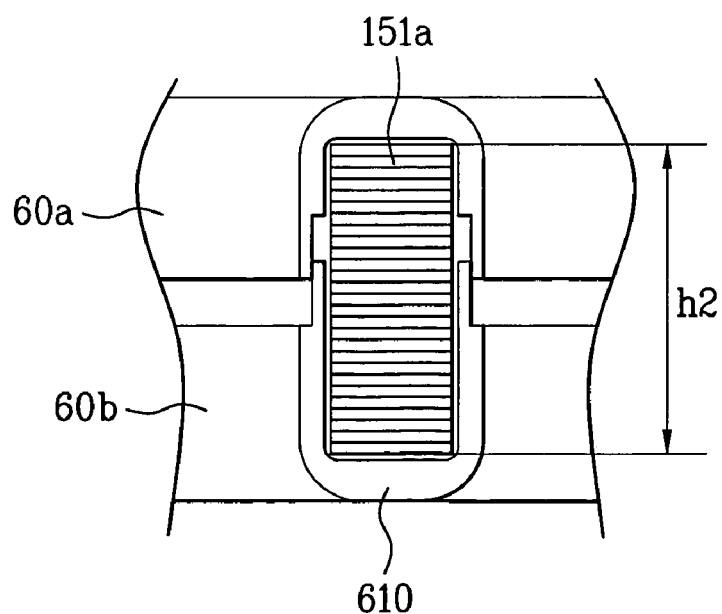

Meanwhile, FIG. 7 is a perspective diagram of a inside of an upper insulator in FIG. 5, FIG. 8 is a layout of the stator in FIG. 4, and FIG. 9A and FIG. 9B are front diagrams of an insulator for common use.

Referring to the drawings, in FIG. 4 and FIG. 5, a stator 6 of an outer rotor type motor according to one embodiment of the present invention comprises a helical core HC having multiple layers formed by winding steel plates in a helix starting from a bottom layer to a top layer, the steel plate having a base portion 150 with teeth 151 projecting from the base portion 150, an upper insulator 60a of an electric insulating material covered on an upper side of the helical core HC in a shape complementary to a shape of the helical core, a lower insulator 60b of an electric insulating material covered on a lower side of the helical core at the time of assembly with the upper insulator having a shape complementary to a shape of a stator core, and at least three fastening portions 600 formed as one body in each of the upper insulator 60a and lower insulator 60b which projects from an inside of the helical core HC toward a center of the stator for fastening the stator 6 to a fixing side of a tub.

In this case, a plurality of slots 152 are provided to the base portion 150 to reduce stress in assembling the core with a plurality of steel plates. And, each of the slots 152 is formed polygonal so that its depth symmetrically becomes smaller from a central portion 152a having a maximum depth H toward each lateral side portion to become zero at an edge of the base portion 150.

Furthermore, the stator 6 includes fastening means to prevent unwinding (spring-back) of any two adjacently stacked steel plates and prevent gaps between any two adjacent layers of the stacked steel plates.

In this case, the fastening means, as shown in FIG. 6A and FIG. 6B, includes a engaging protrusion 154a provided to each upper surface of the teeth 151 of the steel plate and a engaging recess 154b provided to each lower surface of the teeth 151 of the steel plate to correspond to the engaging protrusion 154a.

Alternatively, it is a matter of course that the engaging protrusion 154a is provided to each lower surface of the teeth 151 of the steel plate and the engaging recess 154b is provided to each upper surface of the teeth 151 of the steel plate to correspond to the engaging protrusion 154a.

A fastening portion 600, as shown in FIG. 5, has a fastening hole 620a for securing the stator 6 to a fixing side, such as a tub, with a fastening member. The fastening hole 620a is formed by a boss 620 projected to the back side of the fastening portion 600.

A support rib 650 is provided on an inside along a circumferential direction thereof in contact with the helical core for supporting an inside surface of the helical core HC in each of the upper insulator 60a and lower insulator 60b.

Furthermore, the fastening portion 600 of each of the upper insulator 60a and the lower insulator 60b includes at least one reinforcing rib 660 connected between the boss 620 of the fastening hole 620a and the supporting rib 650 for spreading fastening force concentrated on the boss 620 and reinforcing a strength of the fastening portion 600.

As shown in FIG. 7, the fastening portion 600 of each of the upper insulator 60a and the lower insulator 60b has a reinforcing rib 670 at an inside circumference thereof, and at least one connection rib 680 connected between the reinforcing rib 670 and the supporting rib 650 which supports an inside surface of the core in a radial direction, for providing a supporting force.

The reinforcing rib 670, together with the reinforcing rib 660, connects between the bosses 620 having fastening holes of the upper insulators 60a and the lower insulators 60b to spread the fastening force concentrated on the boss, and reinforce a strength of the fastening portion 600.

Each of the upper insulator 60a and the lower insulator 60b has tips 610a on opposite sidewalls of each of the teeth 610 thereof having shapes in complementary to each other for fitting in at the time of assembly to form a flush surface.

In this case, if one of the tips 610a and 610b has a ']' shape, the other has a '[' shape.

At the opposite end surfaces substantially perpendicular to the opposite sidewall surfaces of the teeth 610 of the upper insulator 60a and the lower insulator 60b, there are tips 610a and 610b having shapes in complementary to each other.

The teeth 610 of each of the upper insulator 60a and the lower insulator 60b has a seating surface 611a at an end for seating a core shoe 151a of the helical core HC.

Along with this, in the vicinity of the fastening hole 620a of the fastening portion 600 of the upper insulator 60a, there is a positioning projection 630 having a shape in complementary to a positioning hole or a slot (not shown) in the fixing side of the tub.

Moreover, there is a cylindrical sleeve 800 in the fastening hole 620a, a spring pin having an elasticity owing to an incised portion, or a hollow pin enabling press fit in the fastening hole 620a, serves as a bushing.

Furthermore, the fastening hole 620a of each of the upper insulator 60a and the lower insulator 60b has a land around the fastening hole 620a for preventing the bolt head from being brought into direct contact with the cylindrical sleeve 800 at the time of bolt fastening.

The base portion 150 has slots 152 for reducing stress at the time of winding in formation of the core to make winding easy, and the multiple layers thereof are fastened with rivets 153 passed through pass through holes in the base portion 150.

A winding beginning portion or a bottom layer of the helical core HC and a winding end portion or a top layer of the helical core HC can be welded to predetermined contact portions of the base portion 150.

Referring to FIG. 8, the stator 6 according to the present invention includes at least three fastening portions 600 formed as one body in each of the upper insulator 60a and the lower insulator 60b which projects from an inside of the helical core toward a center of the stator for fastening the stator to a fixing side of a tub.

If a length of each of the teeth 151 projected from a lateral outside of the helical core HC is set to 'a' and if a distance from a lateral inside of the helical core to a center of the fastening hole of the fastening portion 600 is set to 'b', the fastening portion 600 is formed to meet a definition of 'a≧b'.

Meanwhile, a reference number '8' in FIG. 5 indicates a hole sensor assembly for a motor control and a reference number '9' indicates a tap housing assembly for power connection to supply power to the stator side.

An operation of the above-configured present invention is explained as follows.

First of all, the helical core HC, which is formed by winding steel plates in a helix starting from a bottom layer to a top layer, the steel plate having a base portion 150 with teeth 151 projected from the base portion 150, is used as the core configuring the stator. Hence, the present invention does not need the processes of assembling and welding unit cores for the sectional core SC, thereby simplifying the fabricating process.

And, the helical core HC according to the present invention has not the protrusions of the sectional core, thereby reducing the material loss.

Namely, the method of fabricating the stator according to the present invention is simplified and reduces the material loss.

The fastening means, which include the engaging protrusions 154a and the engaging recesses 154b, are provided to the teeth 151 of the steel plate wound in a helix to prevent unwinding of joined steel plates and prevent gaps between layers of the stacked steel plates, thereby facilitating the accurate core fabrication.

The polygonal recesses 152 are provided to the base portion 150 of the steel plate configuring the helical core HC to prevent the unwinding of the steel plate by reducing the stress of the base portion 150 in winding the steel plate and to facilitate the winding work of the steel plate for the formation of the helical core HC.

Moreover, the stator 6 of the present invention has sufficient rigidity against the fastening force of the bolt in a manner of improving the structure of the upper and lower insulators 60a and 60b without forming the protrusion for standing the fastening force in fixing the stator 6 to the core itself.

That is, by providing structures that work the same with the projected portion of the division core to the fastening portions 600 of the upper insulator 60a and the lower insulator 60b, a stator 6 can be provided, to which the helical core HC is applicable.

Moreover, spaces 640 between the ribs 650, 660, 670, and 680 at a back side of the fastening portion 600 dampen and attenuate vibration occurred during driving the motor, to improve mechanical reliability of the stator 6, and contributes to the reduction of the insulator material.

The supporting ribs 650 of the upper insulator 60a and the lower insulator 60b formed at an inside in contact with the helical core HC along the circumferential direction support an inside of the helical core HC.

The reinforcing rib 660 connected between the boss 620 of the fastening hole 620a and the supporting rib 650 at each of the fastening portion 600 of the upper insulator 60a and the lower insulator 60b spread the fastening force concentrated on the boss 620, and reinforces a strength of the fastening portion 600.

According to this, the stator 6 can effectively prevent a fastening portion of the stator 6 suffering from breakage caused by vibration at the spinning, shaking and deformation of the rotor 5 even at a large capacity drum type washing machine having a weight over 1.5 kg only of the stator, and a spinning speed ranging 600-2,000 RPM.

As a positioning projection 630 in the vicinity of the fastening hole 620a of the fastening portion 600 fits in a positioning hole (not shown) in the tub 2, fastening of the stator is easy.

Hence, the location setting projection 630 facilitates the stator 6 according to the present invention to be coupled with the tub 2, whereby a maintenance and repair work of a serviceman can be easily done for after-service.

Alternatively, it is a matter of course that the positioning projection 630 may be formed on the tub2, and the positioning hole may be formed in the fastening portion 600.

FIG. 9a and FIG. 9b are reference drawings, illustrating a versatility of application of the insulators, wherein it can be noted that the upper and lower insulators 60a and 60b, respectively, are applicable even if a total height of the helical core varies within a certain range.

That is, FIG. 9a illustrates a case when a total height h1 of the core is a height which permits tips 610a and 610b of the upper and lower insulators 60a and 60b fit exactly. FIG. 9b illustrates a case when a total height of the core is a height greater than a case of FIG. 9a such that the tips 610a and 610b of the upper and lower insulators 60a and 60b are unable to fit exactly, but spaced a certain distance.

Even if the total height h2 of the core is greater than a height that permits the tips 610a and 610b of the upper and lower insulators 60a and 60b, respectively, fit exactly, such that there is a space between the tips 610a and 610b, because the insulation against the core teeth is still achievable; the upper and lower insulators 60a and 60b are applicable to the case of FIG. 9b, too.

Thus, since the separate type upper and lower insulators of the embodiment are applicable to the core regardless of the total height of the core within a certain range of the total height, the separate type upper and lower type insulators of the embodiment can improve workability on an assembly line.

Besides, the slot provided to the core are polygonal is polygonal in the above description of the present invention. Yet, the slot can be semicircular or oval to reduce the stress and to facilitate the winding work on the core formation.

Accordingly, the present invention provides the following effects or advantages.

First of all, the material and weight for fabrication of the stator of the drum type washing machine BLDC motor are reduced, the fabrication process is simplified, and the stator can be stably assembled to the fixing side such as a tub.

Specifically, the stator can be stably assembled to the fixing side such as a tub or a bearing housing like the case of applying the sectional core despite the reduction of the materials of the helical core and insulator, whereby the stator weighing at least 1.5 kg is applicable to a drum type washing machine BLDC motor having a rotational speed over 2,000 RPM.

Secondly, the stator is facilitated to be assembled to the tub in the assembly line, whereby a maintenance and repair work of a serviceman can be easily done for after-service.

Thirdly, the present invention facilitates the prevention of the unwinding of adjacently stacked steel plates, the prevention of gaps between adjacent layers of the stacked steel plates, and the fabrication by employing the helical core to perform the winding work for the core formation with ease, and enhances the mechanical reliability and endurance by raising the rigidity of the fastening portion of the stator to reduce the noise and vibration.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stator of an outer rotor motor for a drum washing machine, comprising:
    a helical core having multiple layers formed by winding a steel plate in a helix starting from a bottom layer to a top layer, the steel plate having a base portion with teeth projected from the base portion;
    an upper insulator of an electric insulating material covered on an upper side of the helical core in a shape complementary to a shape of the helical core;
    a lower insulator of an electric insulating material covered on a lower side of the helical core at the time of assembly with the upper insulator having a shape complementary to a shape of a helical core; and
    fastening means for preventing unwinding of any two adjacently stacked layers and preventing gaps between any two adjacent layers, the fastening means including
    an engaging protrusion provided on each upper or lower surface of the teeth of the steel plate; and
    an engaging recess provided on each lower or upper surface of the teeth of the steel plate to correspond to the engaging protrusion.

2. The stator of claim 1, wherein the fastening means is provided to each of the teeth of the steel plate.

3. The stator of claim 1, further comprising at least three fastening portions formed as one body in each of the upper and the lower insulator which project from an inside of the helical core toward a center of the stator for fastening the stator to a fixing side of a tub.

4. The stator of claim 3, wherein a fastening hole is provided in each of the at least three fastening portions to secure the stator to a tub wall with fastening members.

5. The stator of claim 4, wherein the fastening hole in the fastening portion is constructed in a boss projected toward a back side of the fastening portion.

6. The stator of claim 1, wherein each of the upper insulator and the lower insulator includes a supporting rib on an inside along a circumferential direction thereof in contact with the helical core for supporting an inside surface of the helical core.

7. The stator of claim 6, wherein the fastening portion of each of the upper insulator and the lower insulator includes at least one reinforcing rib connected between the boss of the fastening hole and the supporting rib for spreading fastening force concentrated on the boss and reinforcing a strength of the fastening portion.

8. The stator of claim 1, wherein each of the upper insulator and the lower insulator includes tips on opposite sidewalls of each of tooth covers thereof, the tips of the upper insulator having shapes complementary to the corresponding tips of the lower insulator for fitting together at the time of assembly to form a flush surface.

9. The stator of claim 8, wherein the tips on opposite sidewalls of each of the tooth covers include '[' shape if the other side of the upper, and lower insulators includes a ']' shape.

10. The stator of claim 1, further comprising tips having shapes symmetrical to each other at opposite end surfaces substantially perpendicular to opposite sidewall surfaces of tooth covers of the upper insulator and the lower insulator.

11. The stator of claim 1, wherein tooth covers of each of the upper insulator and the lower insulator include a seating surface at an end for seating a core shoe of the helical core.

12. The stator of claim 1, wherein the insulator includes a positioning projection in the vicinity of the fastening hole thereof having a shape corresponding to a positioning hole or a slot on a fixing side of a tub.

13. The stator of claim 12, further comprising a cylindrical sleeve on an inside of the fastening hole.

14. The stator of claim 13, wherein the cylindrical sleeve is a spring pin having elasticity owing to a portion incised along a length direction of an outside surface.

15. The stator of claim 13, wherein the cylindrical sleeve is a hollow pin press fit in the fastening hole, the cylindrical sleeve having no incised portion.

16. The stator of claim 1, wherein the base portion of the helical core includes slots for reducing stress during winding the core.

17. The stator of claim 16, wherein a central portion of each slot represents a maximum depth and depths of each slot symmetrically become smaller toward lateral side portions away from the central portion, the depths of the lateral side portions symmetrically becoming small enough to connect to an edge of the base portion.

18. The stator of claim 16, wherein each slot is provided at the base portion of the helical core and located between two adjacent teeth.

19. The stator of claim 1, wherein the multiple layers are fastened by rivets passed through pass through holes in the base portion.

20. The stator of claim 1, wherein the bottom layer and the top layer of the helical core are welded to predetermined portions of the base portion, respectively.

21. The stator of claim 1, wherein if a length of each of the teeth projected from a lateral outside of the helical core is set to 'a' and if a distance from a lateral inside of the helical core to a center of a fastening hole of a fastening portion is set to 'b', 'a' is equal to or greater than 'b' (a≧b).

22. The stator of claim 1, wherein each of the teeth includes a tooth main body and a tip at an end of the tooth main body, and the engaging protrusion and the engaging recess are located at a middle portion of an upper or lower surface of the tooth main body.

* * * * *